United States Patent

Gottschall

[15] 3,674,192
[45] July 4, 1972

[54] FILM-DRIVING ROLLER WITH DEVICE FOR STOPPING THE DRIVE MECHANISM IF THE FILM IS BROKEN

[72] Inventor: Gernot Gottschall, Boblingen, Germany

[73] Assignee: Firma Franz Morat GmbH, Stuttgart-Vaihingen, Germany

[22] Filed: Dec. 2, 1970

[21] Appl. No.: 94,303

[30] Foreign Application Priority Data

Jan. 8, 1970  Germany ..................... P 20 00 613.7

[52] U.S. Cl. ................................................ 226/11, 200/61.18
[51] Int. Cl. ................................................ B65h 25/32

[58] Field of Search ................. 200/61.17, 61.18; 226/11, 25

[56] References Cited

UNITED STATES PATENTS

| 2,514,402 | 7/1950 | Lyon .............................. 200/61.17 X |
| 3,123,267 | 3/1964 | Dodsworth .......................... 226/11 |

*Primary Examiner*—Allen N. Knowles
*Assistant Examiner*—Gene A. Church
*Attorney*—John Lezdey

[57] ABSTRACT

In an optical-electronic scanning device wherein a control film is passed by film driving means and a film cassette, a means for stopping the device when the film breaks.

9 Claims, 9 Drawing Figures

3,674,192

FILM-DRIVING ROLLER WITH DEVICE FOR STOPPING THE DRIVE MECHANISM IF THE FILM IS BROKEN

BACKGROUND OF THE INVENTION

The use of driving and scanning devices for films, magnetic tapes, punched tapes, and the like, and more particularly, driving and scanning devices for control films or punched tapes exhibiting, in regular order, transparent and opaque markings which are scanned, for the purpose of controlling the operation of machines, e.g. knitting machines, by means of an optical-electronic scanning system, and are converted into electrical signals whereby the said machines are controlled has been known for years.

According to prior art devices, the driving and scanning system contains a stationary, optical-electronic scanning device in front of which the control film is passed by means of two film-driving rollers arranged before or after the scanning station, and an interchangeable film cassette having a central aperture. The cassette of the prior art device is adapted to be fitted to a base-plate carrying the scanning device in a manner such as to surround the scanning device on all sides and the film therein being placed, through a gap open towards the said central aperture around the two film-driving rollers arranged in front of or behind the scanning station. Within the cassette, the film, which may be endless, is placed around a plurality of guide rollers mounted around the central aperture, depending upon its length.

In order to distribute the forces applied to the film by the drive over various locations on the film, two additional film-driving rollers are provided in the film cassette close to the film-entry and film-exit gaps, so that when the device is in operation the film forms two loops. The loop within the cassette is fully decoupled mechanically from the loop outside the cassette so that no transfer of force takes place between the two loops in the film.

OBJECT OF THE INVENTION

It is an object of the present invention to provide a film-tensioning roller reliable in operation and simple in design, by means of which the film may be led past a scanning device at a preselected tension, whereby the machine to be controlled and other devices may be stopped if the film breaks.

SUMMARY OF THE INVENTION

This invention relates to optical-electronic scanning systems. More particularly, this invention relates to means for reacting to an unloading of tension or break in a film in a cassette used with a film driving optical-electronic scanning device used in controlling machines so as to stop the operation of the machine.

To this end, the invention is based upon a film-tensioning roller arranged between film-driving means for the purpose of tensioning a film guided by the said driving means and provided with perforations. The tensioning roller is provided with at least one toothed disc engaging in the film perforations and a drive shaft mounted in the toothed disc and rotating at the same r.p.m. as the other driving rollers. The toothed disc is adapted to rotate against the pull of at least one tension means, under the tension of the film, in relation to the drive shaft. Moreover, a switch means is provided which is closed when the tension means is loaded and is open when the tension means is unloaded as a result of the film breaking.

The invention is characterized in that one end of the tension means, which is preferably a spring, is firmly attached to a carrier pin fastened to the toothed disc rotating freely on the drive shaft, the other end of the tension means is attached to a hub fixed to the drive shaft; which is adapted to rotate against the force of a ball catch and in that hub carries a pivotably mounted pawl which holds the switch contact closed when the tension means is loaded and which is pivoted by the carrier pin, in order to open the said contact switch when the tension means is unloaded due to a break in the film.

DESCRIPTION OF THE PREFERRED EMBODIMENTS

Figure 1:
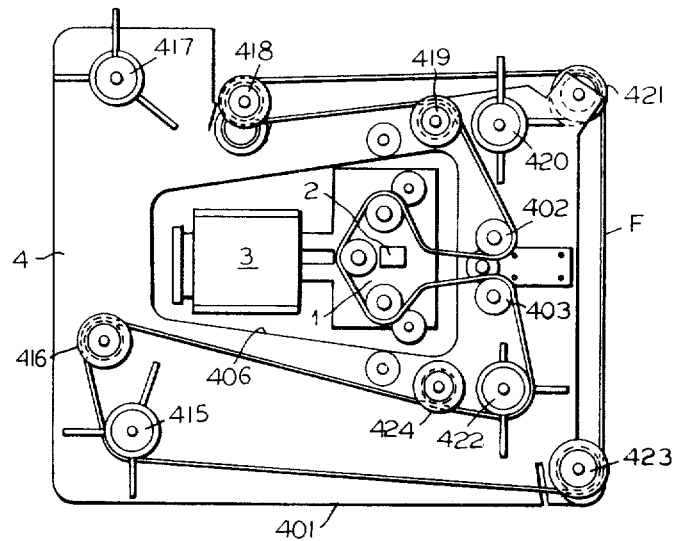
FIG. 1 is a plan view of a film driving and scanning device.
Figure 2:
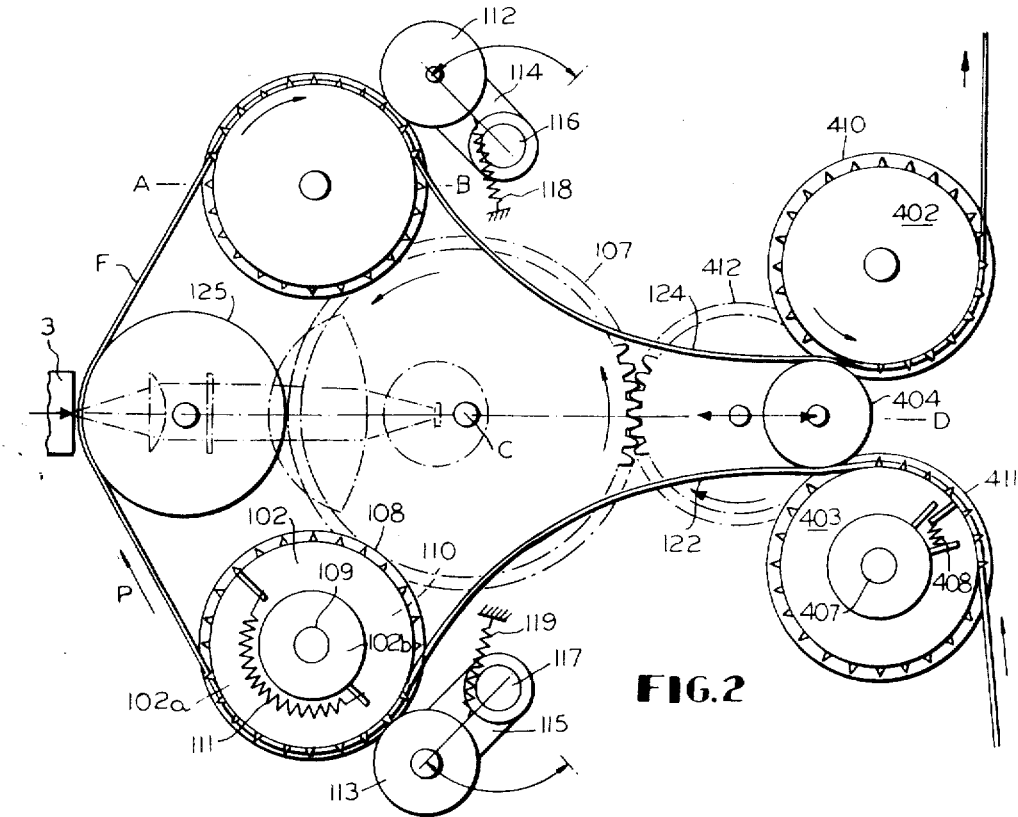
FIG. 2 shows a detail in FIG. 1 to an enlarged scale.

FIG. 1 shows a driving and scanning device for a control film F, or the like. The device as a whole consists essentially of four parts, namely a driving device 1, an optical system 2 having a source of light arranged behind the film F, a scanning or read-off device 3, arranged in front of film F, and an interchangeable film cassette 4 with additional film-driving rollers and guiding rollers.

Figure 3:
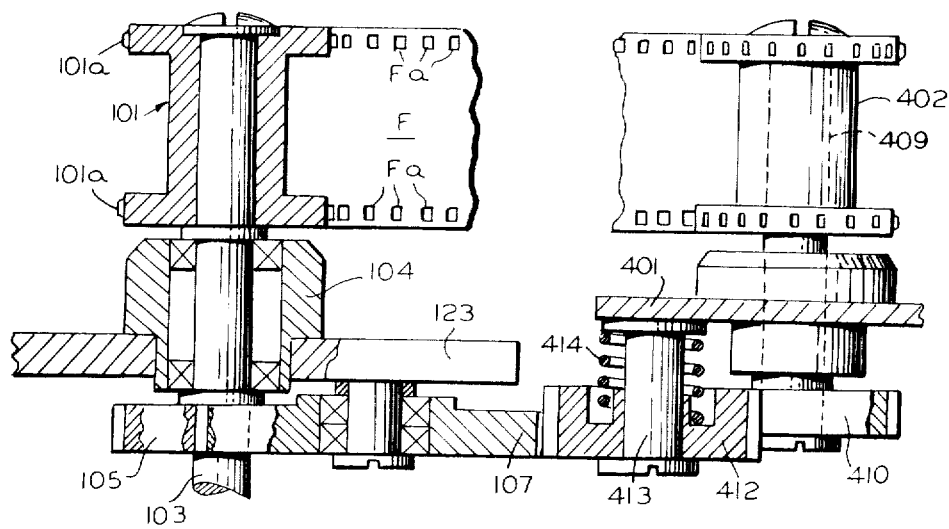
FIG. 3 is a section along the line ABCD in FIG. 2.

Devices 1, 2 and 3 are arranged on a stationary baseplate 123, film F running parallel with the surface of the baseplate 123 in the direction of arrow P. The film F is driven by two driving rollers 101, 102 provided with toothed discs 101a, 102a engaging in the perforations Fa in the edges of the film F. As shown in FIG. 3, driving roller 101 is attached to a shaft 103 running in a bearing 104 attached to baseplate 123. Below baseplate 123, shaft 103 is connected to a driving device (not shown) designed in such a manner, for example, that film F moves continuously or intermittently in time with a machine.

Just under baseplate 123, another gearwheel 105 is attached to shaft 103, the gear 105 engaging, through an idler 107, with a gearwheel 108 fixed to a shaft 109 to the upper end of which is attached driving roller 102, the shaft is mounted in a bearing 110 attached to baseplate 123.

Arranged just in front of, or just behind, driving rollers 101, 102 are pressure rollers 112, 113, the axes of which are seated on pivot levers 114, 115. The axes 116, 117 of pivot levers 114, 115 are mounted on baseplate 123. Pressure rollers 112, 113 are held in their operating or non-operating positions by the tension of helical springs 118, 119.

Arranged between the two driving rollers 101, 102 is a loose film-guiding roller 125, by means of which film F is fed past scanning or read-off device 3 at a specific distance therefrom.

Film cassette 4 contains a baseplate 401 of substantially rectangular cross section and having a central aperture 401. When cassette 4 is inserted and locked, baseplate 401 is somewhat above the surface of baseplate 123. Mounted on each side of the line of symmetry C-D are driving rollers 402, 403. Also provided is a pressure roller 404 which is adapted to move back and forth in the cassette in the direction of line of symmetry C-D for the purpose of changing the film and otherwise corresponds to pressure rollers 112, 113. Shaft 409 of driving roller 402, and shaft 407 of driving roller 403 are mounted in baseplate 401. Attached to the lower ends of shafts 409 and 407, below baseplate 401, are gearwheels 410, 411 engaging with an idler 412. The idler 412 rotates freely and is adapted to move axially upwards against the pressure of a spring 414 seated on a pin 413 in baseplate 401 and engaging with idler 107 on baseplate 123. When the film cassette is being changed, idler 412 may be pushed upwards.

Arranged on baseplate 401 of cassette 4 are freely rotating guiding rollers 415 to 424 located around central aperture 6 on pins perpendicular, or at an angle, to the surface of the plate. Film F is placed around the guiding rollers 415 to 424 in accordance with its length.

In order that the piece of film located between driving rollers 101 and 102 may be guided over film-guide roller 125 at a specific tension so as to ensure the accurate alignment of the film in relation to optical system 2 and the scanning and read-off device 3, the film-driving roller 102 is arranged in front of the filmeguide roller 125 in the direction of travel P of the film is preferably in the form of a film-tensioning roller (FIGS. 4 to 9). According to one preferred embodiment of this invention, a toothed film roller 13 is mounted by means of a ball bearing or the like so as to rotate freely on a shaft 109 which communicates via a gearwheel 108, an idler 107, and a gearwheel 105, with a drive device (not shown), and is in the form of a hollow shaft. Attached to roller 13 is a carrier pin 15. Also mounted on shaft 109, above film roller 13, is a hub 17 adapted to rotate on shaft 109 against the force of a ball catch 19 which consists of a gearwheel 21 attached to shaft 109 and balls 25 mounted in hub 17 and preloaded by springs 23. Attached to hub 17 is a pin 27 which like carrier pin 15 projects into a cavity 28 between film roller 13 and hub 17. The ends of the tension spring 29 are attached respectively to carrier pin 15 and pin 27.

Figure 4:
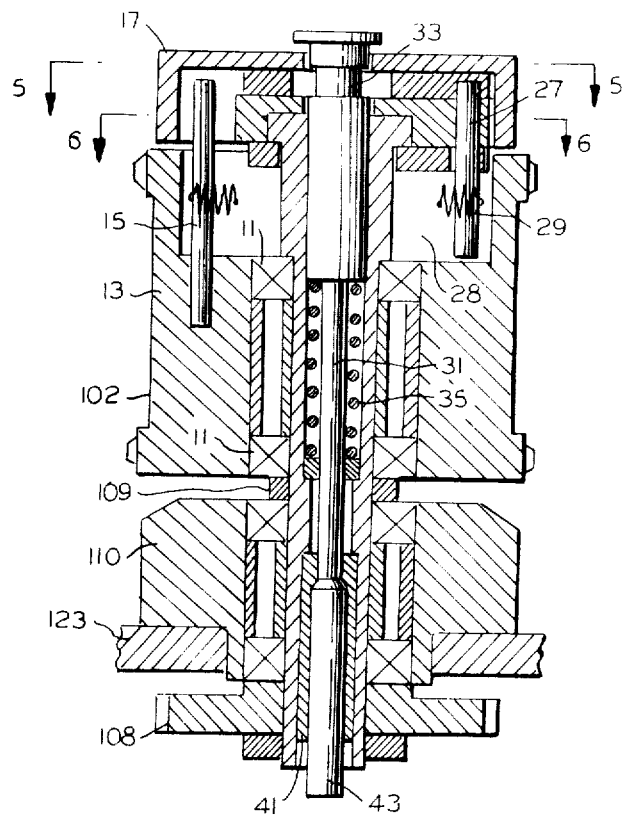
FIG. 4 is a section through a film-tensioning roller according to the invention, with the film under tension.
Figures 5, 6:
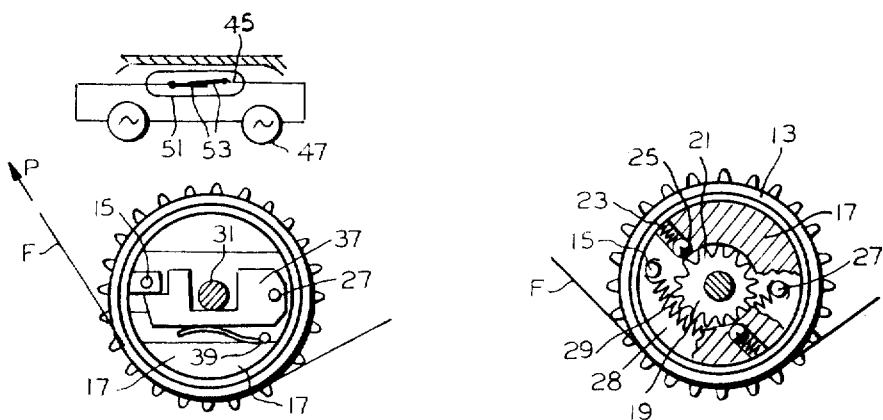
FIG. 5 and 6 are sections along the lines 5 — 5 and 6 — 6 in FIG. 4.
Figure 7:
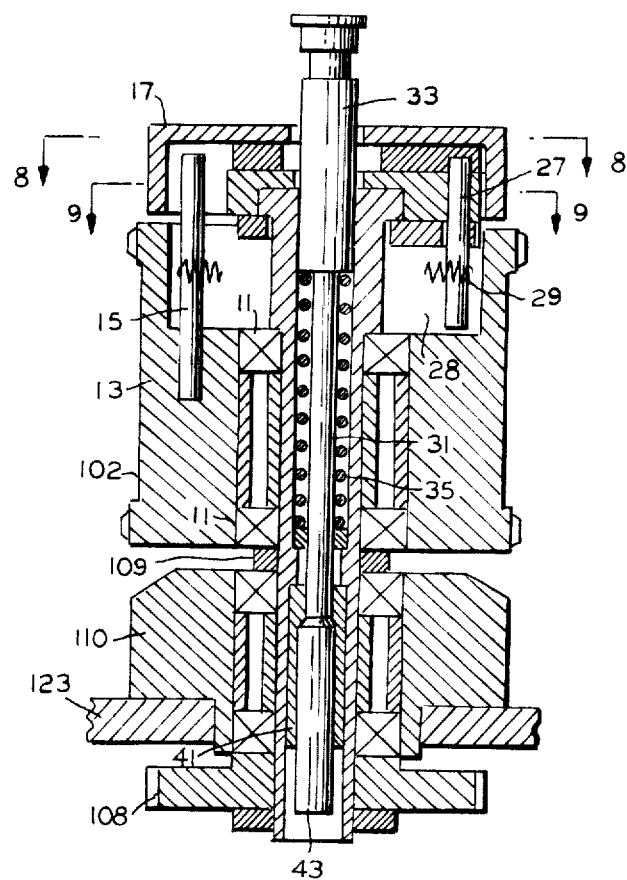
FIG. 7 is a section through the film-tensioning roller in FIG. 4, with the film broken.
Figure 8:
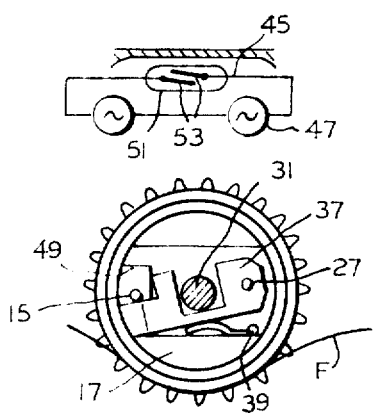
FIGS. 8 and 9 are sections along the lines 8 — 8 and 9— 9 in FIG. 7.
Figure 9:
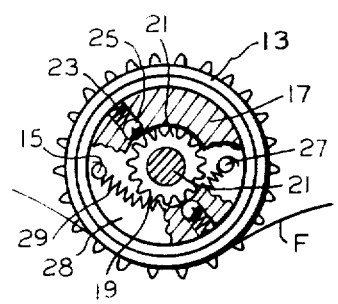

Mounted in hollow shaft 109 is an axially displaceable rod 31, the upper end of which has a groove 33, as shown in FIG. 4. Placed around a central part of rod 31 is a spring 35, one end of which rests against a projection on rod 31, while the other end rests against a projection on drive shaft 109. Thus in its normal position, with spring 35 decompressed, rod 31 is pushed upwards.

Pivotably mounted on a pin 27 of hub 17 is a pawl 37 which is pressed against rod 31 by means of a leaf spring 39, one end of which is attached to hub 17 while the other end rests against pawl 37.

Attached to the lower end of rod 31 is a magnet holder 41 into which a small permanent magnet 43 is fixed. The magnet 43 cooperates with a switch contact 45, which may be wired into the electrical circuit of a motor 47 for the drive device (not shown).

The film tensioning roller operates as follows:

When hub 17 rotates to the left against the force of ball catch 19, film roller 13, which is mounted so as to rotate freely on shaft 109, is carried along by tension spring 29 which is coming under a load. By this operation there is applied tension to film F which runs on the film roller. The teeth the roller engage in the perforations in the film with the tension being in a direction opposite to that of the travel of the film. Once film F has been taughtened, film roller 13 can no longer be carried along by tension spring 29 so that further rotation to the left applies tension to hub 17.

Rotation of hub 17 to the left causes pawl 37, which is pressed by leaf spring 39 against the upper end of rod 31, to rotate in relation to carrier pin 15 until it comes out of engagement therewith. Hub 17 is rotated to the left until carrier pin 15 comes up against a stop 49 (FIG. 5) in hub 17.

Ball catch 19 holds hub 17 in this position, in which tension spring 29 is loaded, so that film F remains tensioned by the spring 29 when shaft 109 is rotated in the direction of travel of the film. In order to close switch contact 45, rod 31 is pushed down manually until pawl 37 engages in groove 33. With the rod in this position, tension spring 35 is loaded, bringing permanent magnet 43 to its lowermost position whereby it keeps switch contact 45 closed. The device driving film F may therefore be set in operation.

If film F breaks while it is running, or if the tension of the film between driving roller 101 and film-tensioning roller 102 decreases a great extent, film roller 13 is rotated by tension spring 29 in a direction opposite to the travel of the film so as to bring carrier pin 15 within reach of pawl 37. Then film roller 13 is rotated by tension spring 29 still further in relation to hub 17 and the said carrier pin forces pawl 27 out of groove 33 against the force of leaf spring 39. This results in compressing spring 35 causing rod 31 to move upwards out of the position shown in FIG. 4 into the position shown in FIG. 7 and moves permanent 43 out of the range of switch contact 45, which therefore opens. The opening of switch contact 45 breaks the circuit to motor 47 and the drive device (not shown) is stopped.

When film F or cassette 4 is changed, the tension in the film is first of all released by rotating hub 17 to the right by a few clicks of ball catch 19. This brings carrier pin 15 up against pawl 37, which is the same position as when the film breaks so that rod 31 is moved upwards by compression spring 35 and the drive device is stopped.

Switch contact 45 may be a Reed contact, for example, consisting of a glass tube 21 into which are fused two weakly magnetic contact tongues 53. These tongues are brought into contact with each other by the magnetic field of permanent magnet 43 when the latter is in its lowermost position (FIG. 4). On the other hand, when the magnet 43 is in its uppermost position (FIG. 6), the force of its field is no longer sufficient, and contact tongues 53 therefore snap back into their position of rest, thus opening the circuit to motor 47.

By means of the film-tensioning roller, the film running on driving rollers 102, 402, and 403 and film-tensioning roller 102 is guided around film-guiding roller 125 at the desired tension. Also retained is the advantage that the loop of film outside film cassette 4 is mechanically decoupled from the loop of film inside cassette 4. Finally the device driving film F is immediately switched off when-ever the tension of the film between film-tensioning roller 102 and driving roller 101 becomes too low. The tension in the film between driving rollers 101, 402 and 402, 403, and between film-tensioning roller 102 and driving roller 403 has no effect whatever on the tension in the film between film tensioning roller 102 and driving roller 101, or on the operation of film tensioning roller 101.

The film-tensioning roller described in the foregoing is particularly suitable for film-driving devices having the driving roller 403 located at the exit from film cassette 4 in such a manner that it responds to over-tightening of the loop of film inside cassette 4 and stops the drive device when this tension becomes too high which is the subject matter of copending application Ser. No. 94457 filed Dec. 2, 1970. If use is made of a driving roller 402 of this kind the device driving the film will be stopped not only whenever the film breaks at a point between rollers 101 and 102, but also whenever the tension in the film inside cassette 4 becomes too high, for any reason whatever, e.g. by sticking. There is no danger of excessive film tension, or breaks in the film, between rollers 101, 402 or 403,101, since the film may be allowed to run slack in these areas.

Obviously, the embodiment shown is exemplary only and a wide variety of embodiments may be devised without departing from the spirit and scope of the invention.

What is claimed is:

1. In a film driving system having a baseplate and a plurality of means mounted for driving a film with perforations, a pressure sensitive drive means for tensioning said film and for stopping said film when tension is unloaded on said film comprising at least one resilient tension means, a toothed member mounted on a drive shaft adapted to rotate against the pull of said tension means, said tension means having one end connected to a pin on said toothed member and the other end connected to a hub on said drive shaft, switch means normally in a closed position, and a pawl pivotably mounted on said hub adapted to hold said switch means in a closed position when the tension means is loaded and being pivoted by said pin when said tension means is unloaded so that said switch contact is open to deactivate driving of said film.

2. The system according to claim 1 wherein said tension means is a tension spring.

3. The system according to claim 1 including a ball catch having a gearwheel attached to said drive shaft and spring loaded balls attached to said hub.

4. The system according to claim 1 wherein said pawl is pressed against said drive shaft of said pressure sensitive drive means by a leaf spring, said pawl being spaced from said pin when said compression means is decompressed and being moved away from said drive shaft by said pin against the force of said leaf spring when said compression spring is compressed.

5. The system according to claim 1 wherein said drive shaft is hollow, and includes a grooved rod mounted displaceably in said drive shaft by a compression spring for actuating said switch means, whereby said rod after being displaced against the force of said spring by means of said pawl engaging in the groove of said rod is capable of being locked in position and brought into a second position when the tension in the film is unloaded by said pawl being forced out of said groove by said spring.

6. A system according to claim 5 including a permanent magnet attached to one end of said rod, said magnet holding said switch means closed in one position of said rod, and holding said switch means open in the other position of said rod.

7. The system according to claim 1 wherein said system is in a film cassette.

8. The system according to claim 1 which includes a plurality of drive shafts having toothed discs for driving said film, all of said drive shafts rotating at the same speed.

9. The system according to claim 1 including a pressure roller mounted on said baseplate capable of moving in a reciprocating motion so as to change the film.

* * * * *